Dec. 22, 1936. C. B. SAWYER Re. 20,213

PIEZOELECTRIC DEVICE

Original Filed May 6, 1927

INVENTOR
C. B. Sawyer
BY
Evans & McCoy
ATTORNEYS

UNITED STATES PATENT OFFICE 20,213

PIEZOELECTRIC DEVICE

Charles B. Sawyer, Cleveland Heights, Ohio, assignor, by mesne assignments, to The Brush Development Company, Cleveland, Ohio, a corporation of Ohio Original No. 1,802,782, dated April 28, 1931, Serial No. 189,443, May 6, 1927. Renewed November 18, 1930. Application for reissue April 27, 1933, Serial No. 668,233

7 Claims. (Cl. 179—110)

This invention relates to piezo-electric material and more particularly to an improved method and means for utilizing the piezo-electric effect of such material.

In piezo-electric devices for use at audio frequencies various piezo-electric materials such as quartz and Rochelle salt crystals have been suggested. In general, however, quartz is not sensitive enough for such work and Rochelle salt crystals, nothwithstanding the large piezo-electric effect obtained therefrom, have certain disadvantages, particularly inconstancy of the piezo-electric effect produced and non-permanency of the crystals. I shall later point out more fully the nature of these particular disadvantages and their causes.

One object of this invention is to provide a piezo-electric element utilizing Rochelle salt crystalline material and in which the inconstancy of the piezo-electric effect and the non-permanency of the crystal bodies characteristic of prior practice are substantially obviated.

Another object of this invention is to provide piezo-electric elements of rugged character.

A further object of the invention is to provide piezo-electric elements of uniform character giving uniform piezo-electric results.

Another object of the invention is to provide piezo-electric elements of relatively great sensitivity or relatively great piezo-electric effect.

Another object of this invention is to provide a piezo-electric element of advantageous piezo-electric characteristics and capable of being produced by economical use of piezo-electric material.

Another object of my invention is to provide an improved method for utilizing the piezo-electric effect of piezo-electric material.

A further object of this invention is to provide piezo-electric devices whereby improved piezo-electric effects may be obtained.

Other objects of my invention will be apparent to those skilled in the art from the following description and annexed drawing.

My invention contemplates the provision of piezo-electric elements having characteristics of permanency, high sensitivity and constancy of piezo-electric effect, said elements embodying piezo-electric material, preferably in the form of Rochelle salt crystalline material or other crystalline material having a piezo-electric constant of the same order of magnitude and similar piezo-electric properties, constrained in such a manner that said element has a magnified mechanical motion when it is subjected to an electrostatic field. More specifically, the said piezo-electric material of the element is arranged to elongate or contract when subjected to an electrostatic field and is so constrained that a bending movement of the element is produced by the said elongation or contraction with a resultant magnified mechanical displacement of a portion of the element. My invention also contemplates certain features of construction for piezo-electric elements which will be specifically described and explained in the following description.

Figure 1:
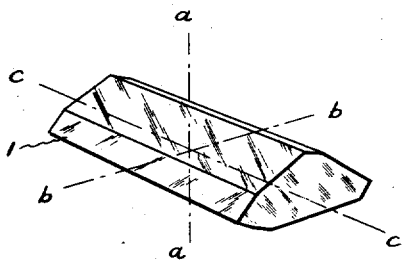
Figure 1 is a perspective view of a Rochelle salt crystal from which the piezo-electric material for my invention may be obtained.

While, in some aspects of my invention, various piezo-electric materials differing widely as to their piezo-electric constants and properties can be employed in carrying out my invention, I prefer to employ crystal portions obtained from Rochelle salt crystals or other crystals having piezo-electric constants of the same order of magnitude and similar piezo-electric properties. Thus, the material for an element of my invention may be obtained from a Rochelle salt crystal 1 as illustrated in Fig. 1, the said crystal having the major longitudinal axis *c—c*, the major transverse axis *b—b* and the minor or electrical axis *a—a*. As an illustration of one manner in which my improved element may be constructed, I may cut or otherwise obtain from a crystal 1 or portion thereof a slab 2 illustrated in Fig. 2, said slab being preferably cut so that its parallel faces 3 are substantially parallel to the major crystalline axes and substantially perpendicular to the minor crystalline axis.

Figure 2:
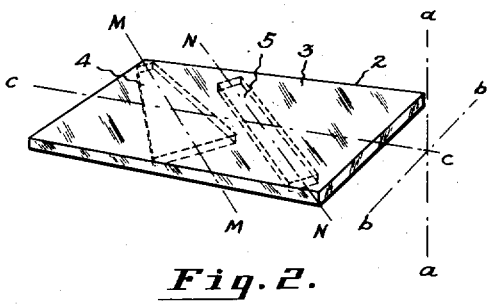
Fig. 2 is a perspective view of a slab of piezo-electric material such as Rochelle salt, portions thereof for my improved device being indicated in dotted lines.

At 4 and 5 in dotted lines in Fig 2 I have illustrated how portions to be used in my improved element may be obtained from the slab 2. At 4 is shown a portion of trapezoidal shape whereas at 5 is shown a portion of substantially rectangular shape. The portions 4 and 5 are preferably so cut from the slab 2 that the longitudinal axes M—M and N—N are at substantially 45 degrees to the major crystalline axes, for reasons to be further discussed hereinafter. The faces of the portions 4 and 5 are substantially parallel. It will be understood, of course, that the portions 4 and 5 may be cut directly from a crystal such as 1, or a portion thereof.

Figure 3:
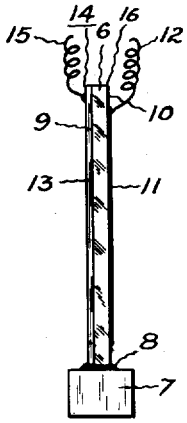
Fig. 3 is an end elevation of a piezo-electric element of my invention, said element being mounted on a suitable support.

In Fig. 3, the crystal portion 6 is shown secured at one end thereof to a suitable support 7 such as of lead by adhesive material 8 such as, for example, shellac or Canada balsam. The faces 9 and 10 of the portion 6 may be of rectangular or trapezoidal shape as illustrated in Fig. 2 or of any other suitable shape. To the face 10 is shown secured a suitable electrode 11 such as of tin foil, which electrode extends nearly to the four edges of the portion 6 so as to contact with a relatively large part of the face 10. The wire 12 is connected to the electrode 11. To the opposed face 9 is shown secured a portion 13 which may be of metal, such as aluminum, and may be relatively thin but of sufficient strength to constrain the crystal portion 6. The crystal portion 6 and metal portion 13 constitute what may be termed the piezo-electric element 14. The portion 13 preferably, though not necessarily, is co-extensive with the face 9 of the portion 6 and is preferably secured to said portion throughout said face 9 as by suitable adhesive material, the portion 13 being secured to the support 7 as by the adhesive material 8. A wire 15 is secured to said metallic portion whereby the portion 13 may act as an electrode. If the crystal portion 6 is cut from a crystal in the manner indicated in Fig. 2, the said portion 6 when subjected to an electrostatic field by the electrodes 11 and 13 will tend to contract in length and simultaneously expand in width or to expand in length and simultaneously contract in width, depending upon the direction of said field through the crystal portion 6. Since, however, the motion of said portion 6 is constrained by the portion 13, the crystal portion 6 is not free to elongate and simultaneously contract in width or to contract in length and simultaneously expand in width, but actually undergoes bending motions about two axes disposed at right angles to each other on opposite sides of the element and parallel to the faces of the portion 6, one of these axes being longitudinal of the element and the other transverse thereof. As a result of the bending about the transverse axis the upper edge 16 of the crystal portion 6 actually has a greater mechanical motion than if the crystal portion 6 were unconstrained by the portion 13, though in a different direction.

Figure 4:
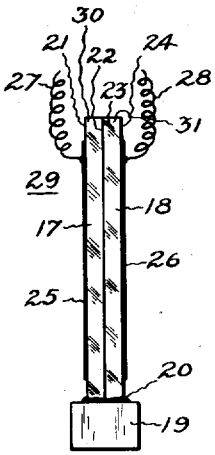
Fig. 4 is an end elevation showing a modified form of element mounted on a support.
Figure 5:
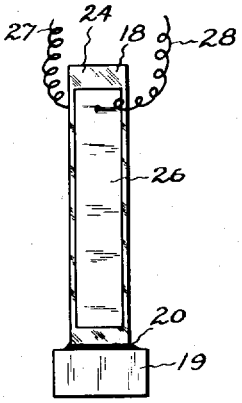
Fig. 5 is a front elevation of the structure shown in Fig. 4.

In Figs. 4 and 5 I have shown a modified form of my invention wherein crystal portions 17 and 18 are shown in juxtaposed position, the said portions being both secured to a support 19 by adhesive material 20. The faces 21, 22, 23, and 24 of the crystal portions 17 and 18 may be of rectangular shape, as shown in Fig. 5, or of any suitable shape such as discussed in connection with Fig. 3. The adjacent faces 22 and 23 may be secured to each other throughout their extent by suitable cement whereby the crystal portion 17 acts to constrain the motion of the crystal portion 18, and vice versa. Electrodes 25 and 26 are shown as associated with the faces 21 and 24 and wires 27 and 28 are secured respectively to said electrodes. The crystal portions 17 and 18 are so oriented that under a given electrostatic field one of said crystal portions tends to contract and the other crystal portion tends to elongate longitudinally. This may be referred to as an opposed electrostatic relationship of the crystal portions. Under such conditions, when the piezo-electric element 29 comprising the crystal portions 17 and 18, is subjected to an electrostatic field by means of the electrodes 25 and 26 the portions 17 and 18 flex about transverse and longitudinal axes and a greater motion of the top edges 30 and 21 is obtained, due to the bending about the transverse axis resulting from the simultaneous lengthwise contraction of the portion 17 and elongation of the portion 18, and if the electrostatic field is reversed, the portion 17 will elongate and the portion 18 will contract lengthwise and the top edges 30 and 31 will move in the opposite direction. Furthermore, if external forces are applied to the top edges of the element tending to produce similar bending motions of the element, corresponding electromotive forces will be generated at the electrodes.

Figure 6:
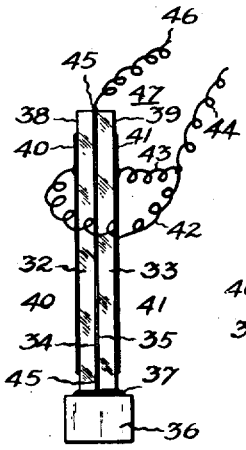
Fig. 6 is an end elevation of another modified form of element contemplated by my invention mounted on a suitable support.
Figure 7:
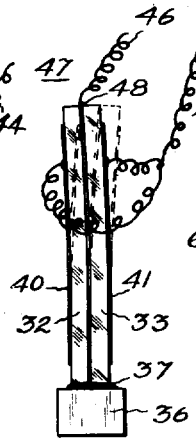
Fig. 7 is an end elevation of the structure shown in Fig. 6 showing in exaggerated form the motion of the element when subjected to an electrostatic field.

In Figs. 6 and 7 is shown another modified form of piezo-electric element comprising the crystal portions 32 and 33 having the adjacent faces 34 and 35, said portions being secured to the support 36 by suitable adhesive material 37. To the outer faces 38 and 39 are shown secured electrodes 40 and 41 respectively connected by the wires 42 and 43 to a single wire 44, said electrodes 40 and 41 thereby forming a single terminal. Intermediate the inner faces 34 and 35 is shown a relatively thin electrode 45 which preferably is substantially co-extensive with the faces 34 and 35, said electrode being cemented to the faces 34 and 35 and thereby uniting the crystal portions 32 and 33. Such electrode may be constituted of aluminum foil. To said electrode is secured a wire 46. The electrode 45 thus forms one terminal and the electrodes 40 and 41 the other terminal of the element. The crystal portions 32 and 33 are arranged in opposed electrostatic relationship, preferably by so orienting said portions that if they were subjected to a given electrostatic field both portions would tend to expand in length and contract in width or, vice versa, according to the direction of the field, so that when a given voltage is applied to the wires 44 and 46 the crystal portions 32 and 33 are subjected to electrostatic fields in opposite directions and the portion 32 will tend to contract longitudinally while expanding laterally and the portion 33 to expand longitudinally while contracting laterally and upon the reversal of the voltage, the portion 32 will tend to expand longitudinally while contracting laterally and the portion 33 to contract longitudinally while expanding laterally. As a net result, the element 47 comprises the crystal portions 32 and 33 and the intermediate electrode 45, due to the mutual constraining effect of the crystal portions 32 and 33, will be given bending motions about transverse and longitudinal axes, the motion about the transverse axis being illustrated in exaggerated form in Fig. 7, and the point 48 will thus have greater mechanical movement as the result of said applied voltage than would be obtained without said mutual constraint. Here, as in the case of the element shown in Figs. 4 and 5, if external forces are applied to the top edges of the element tending to produce similar bending motions thereof, corresponding electromotive forces will be generated at the electrodes.

Figure 8:
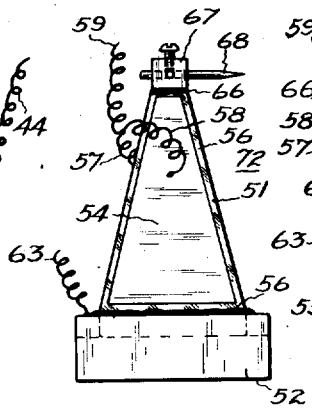
Fig. 8 is a front elevation of a piezo-electric device contemplated by my invention embodying a modified form of element, said device embodying a jewel for cutting phonograph records.
Figure 9:
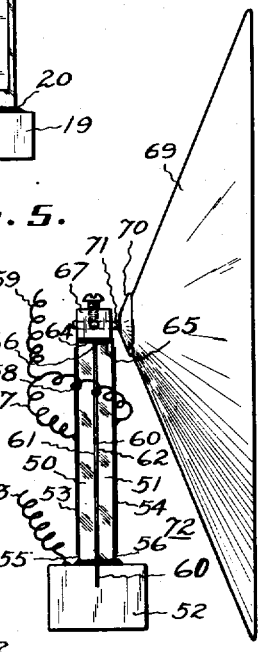
Fig. 9 is an end elevation of the structure shown in Fig. 8, a conical acoustic diaphragm being shown associated with the element.

In Figs. 8 and 9 are shown acoustic devices embodying a modified form of piezo-electric element. Thus, the crystal portions 50 and 51 are shown secured at their lower edges to the support 52, electrodes 53 and 54 being secured to the outer crystalline faces 55 and 56, and wires 57 and 58 being secured to said respective electrodes. Said wires are shown connected to each other and to the wire 59 to form a single terminal. An electrode 60 is shown disposed intermediate the inner faces 61 and 62, said electrode extending into and being electrically connected to the support 52, and a wire 63 being shown secured to the support 52. The faces of the crystalline portions 50 and 51 may be substantially trapezoidal in shape as shown in Fig. 8, or of any other suitable shape. To the upper edges 64 and 65 are shown secured by adhesive material 66 a clamp member 67 provided with suitable apertures whereby there may be secured to said clamp member a suitable acoustic member such as the phonograph record-cutting jewel 68 shown in Fig. 8, or the conical acoustic diaphragm 69 shown in Fig. 9, the said diaphragm 69 being secured to the cup-shaped member 70 and shaft 71. The crystal portions 50 and 51 are preferably similarly oriented as disclosed in connection with Figs. 6 and 7 whereby when variable voltages are applied to the wires 59 and 63, as by alternating or pulsating currents, the element 72 comprising the crystal portions 50 and 51 and electrodes 60 will be given a bending movement, in the manner described in connection with Figs. 6 and 7, and the clamp member 67 a vibratory motion in a path substantially perpendicular to the faces of the crystal portions 50 and 51. Thus, the cutting jewel 68 shown in Fig. 8 would vibrate in a path substantially perpendicular to the plane of face 56, and the cone 69 would vibrate in a direction longitudinally of the shaft 71. The trapezoidal shape of crystal portion shown in Fig. 8 is particularly advantageous acoustically since such crystal portions may be considered as made up of an infinite number of portions of unequal longitudinal dimension, therefore tending to respond to an infinite number of natural periods whereby very desirable acoustic results are obtained, and within the audible range resonances or blasts are absent.

Reference has already been made to the double curvature of the piezo-electric element resulting from the constraint of the simultaneous expansion in length and contraction in width or contraction in length and expansion in width of the Rochelle salt crystal plate or plates of the element. This reverse or saddle-like curvature tends to stiffen the element and make it better adapted for certain purposes such, for example, as use as a motor or driving element.

The simultaneous expansion in length and contraction in width or contraction in length and expansion in width of the Rochelle salt crystal plates, which has been referred to above, causes my multiple-plate elements of Rochelle salt to flex simultaneously about two axes on opposite sides of the element and in planes at right angles to each other, one of these axes in the specific construction described being longitudinal of the element and the other transverse thereof. This reverse or saddle-like curvature tends to stiffen the element and make it better adapted for certain purposes such, for example, as use as a motor or driving element.

It will, of course, be understood that the vibratory movement referred to in connection with Figs. 8 and 9 is characteristic also of the elements shown in Figs. 3 to 7 when alternating or pulsating voltages are applied to said elements. Also, it will be understood that each of the piezo-electric elements which have been described will convert the energy of applied vibratory forces into corresponding electrical energy with the same facility with which, as previously described, the applied electrical energy is converted into vibratory motion, the specific piezo-electric effect, or response per unit increase of applied energy, being the same in whichever direction the transformation of energy occurs. Thus, the device shown in Fig. 8 can also be used as a phonograph pickup and the device shown in Fig. 9 will also function as a microphone.

It should be understood that acoustic parts of various forms other than the jewel 68 and the diaphragm 69 may be advantageously used in connection with my improved piezo-electric elements. Indeed, I may so use any device capable of picking up or transmitting vibrations that are of a character to stimulate the auditory nerve.

In the light of the foregoing description the advantages of my invention in comparison with prior practice will readily be appreciated. In prior uses of Rochelle salt crystals for piezo-electric purposes either entire crystals of the "hour glass" type were employed or the simple expansion effect of solid blocks or plates cut from crystals was utilized and these uses were marked by inconstancy of the piezo-electric effect produced arising from several causes. One important cause was the effect of variation in temperature upon the piezo-electric effect produced. Where an entire Rochelle salt crystal constituted the piezo-electric element or a part thereof variations in the temperature to which the element might be subjected were accompanied by more or less erratic changes in the piezo-electric response, probably due to the temperature effect on the solubility of the Rochelle salt in the mother liquor occluded in substantial amounts in the crystal. Where blocks or plates of homogeneous character cut from Rochelle salt crystals were employed a direct piezo-electric effect was utilized and it was found that the piezo-electric effect varied markedly with the temperature, and this result has been recognized as characteristic of Rochelle salt. One of the marked advantages of my invention is that by the use of a portion or of portions of Rochelle salt crystal in the manner herein described to form piezo-electric elements which in operation have a bending motion incident to constraint, the effect of variation in temperature upon the element has been largely reduced.

A second important cause of the inconstancy of the piezo-electric effect of prior devices employing Rochelle salt was the fact that as the applied voltage increased the corresponding piezo-electric response per volt decreased in a manner analogous to the well known magnetic saturation effect in iron. The results of this saturation of Rochelle salt crystal are particularly objectionable in acoustic work since they result in distortion or unfaithful reproduction varying from the introduction of a few unpleasant harmonics at low volume to severe distortions at high volumes which may even result in distinctly foreign sounds or blasts not present in the original impulses. With my improved form of piezo-electric element the falling off in the piezo-electric response with rise in the level of the applied voltage, or energy is substantially eliminated throughout a very much greater range in voltage than is the case when the simple expansion effect of Rochelle salt crystal is utilized.

The attainment of the results noted in the last two paragraphs by means of my invention makes possible notably improved piezo-electric effects, especially in acoustic or other applications where constancy of response over wide ranges of frequency, loading and temperature is desirable. It may be noted in this connection that the results referred to appear to be more marked with thin crystal portions than with thick ones.

A marked advantage attaching to all forms of my improved piezo-electric element when made of Rochelle salt crystal is the relatively high degree of ruggedness both electrical and mechanical which the construction of the element makes possible. Several things contribute to this ruggedness. First, the fact that only portions of a crystal are employed makes feasible the utilization of crystalline material of homogeneous character. Again, a highly uniform distribution in the crystalline material of electrical stresses is attained because of the uniform thickness of the crystal portions of the elements. Also, because of the extremely high piezo-electric constant of Rochelle salt crystal it is possible to use, for a given piezo-electric response under a given excitation, a thicker crystalline portion in any of the element forms which have been described; and in the case of the elements shown in Figs. 6 to 9, still greater advantage in this respect is made possible by the use of the internal sheet-like electrode which quadruples the thickness of the crystal portion which can be employed for a given electrostatic capacity of the element, this last advantage of the internal electrode applying not only to elements formed with Rochelle salt crystal portions but also with other piezo-electric crystalline material. Finally, in the case of the element illustrated in Figs. 8 and 9 the trapezoidal form of the element causes an equalization of the mechanical stresses throughout the length of the structure, this too being independent of the specific piezo-electric material employed.

By my invention elements made of Rochelle salt crystal may be made highly uniform in character both because the crystalline portions of which they are composed may be accurately duplicated in size and also because these portions may be so selected as to be highly homogeneous with respect to their constitutent crystalline material. These same two factors also contribute to the uniformity of piezo-electric results attained by my improved elements, other factors contributing to such results being the uniformity of assembly of the crystal portions which is made possible by their uniform size and homogeneous character, and the substantial reduction of temperature and saturation effects upon the piezo-electric response. The trapezoidal form of element shown in Figs. 8 and 9, regardless of the crystalline material employed, also contributes to uniform piezo-electric results due to the graduated longitudinal dimensions, since the natural period of a crystal depends upon its length and the trapezoidal shape may be considered as made up of elements of a wide range of length within the limits of the dimensions of the trapezoidal figure and is, therefore, more uniformly sensitive over a wide range of frequencies.

The relatively large mechanical movement characteristic of my improved element is peculiarly marked in conjunction with the use of Rochelle salt crystalline material because by my invention I secure a magnification of the extremely high natural piezo-electric response of that material.

In those forms of the piezo-electric element illustrated in Figs. 6 to 9, the use of an internal electrode substantially coextensive with the faces of the crystal portions is highly advantageous in that it makes possible the attainment of an extremely high electrostatic capacity with the use of a given amount of crystalline material. This is especially advantageous in acoustic applications, where low impedance is desirable, as it facilitates the attainment of a comparatively low impedence without necessitating the use of portions of undesirable thinness in the construction of the elements, it being mechanically difficult to produce crystal portions sufficiently thin to attain the low impedance desired in some applications.

My method of utilizing the piezo-electric effect by the great ruggedness, the low impedance and direct connection of the piezo-electric element with a vibratory acoustical member, made practically possible by the great amplitude of movement of the element, is obviously advantageous.

To those skilled in the art, many modifications of and widely differing embodiments and applications of my invention will suggest themselves without departing from the spirit and scope thereof. My disclosures and the descriptions herein are purely illustrative and are not intended to be in any sense limiting.

What I claim is:

1. A piezo-electric transducer element comprising in combination a flexible plate-like portion of material having substantially the piezo-electric properties of Rochelle salt crystal, the said plate-like portion having an electrical axis substantially perpendicular to the faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed; and constraining means adapted to oppose expansion and contraction of the flexible portion in both of the said directions and cause said portion, when subjected to the action of an electrostatic field of given polarity, to bend about two axes of curvature disposed at right angles to each other on opposite sides of the element and parallel to the faces of the plate-like portion of the element and, conversely, cause the establishment of such an electrostatic field when the portion is mechanically bent, whereby variations in the specific piezo-electric effect incident to variation in temperature and incident to variation in the level of applied energy, are largely reduced.

2. A piezo-electric transducer element comprising in combination a flexible plate-like portion of material having substantially the piezo-electric properties of Rochelle salt crystal, the said plate-like portion having an electrical axis substantially perpendicular to the faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed; and a flexible plate-like body cemented to one face of the said plate-like portion and adapted to oppose expansion and contraction of the said portion in both of the said directions and cause said portion, when subjected to the action of an electrostatic field of given polarity, to bend about two axes of curvature disposed at right angles to each other on opposite sides of the element and parallel to the faces of the said portion of the element and, conversely, cause the establishment of such an electrostatic field when the portion is mechanically bent, whereby variations in the specific piezo-electric effect incident to variation in temperature and incident to variation in the level of applied energy, are largely reduced.

3. A piezo-electric transducer element comprising in combination a plurality of flexible plate-like portions of material having substantially the piezo-electric properties of Rochelle salt crystal, said plate-like portions being disposed in opposed electrostatic relationship to each other with the faces of each portion substantially perpendicular to an electrical axis, whereby each portion is adapted to expand in one direction parallel to its faces and simultaneously to contract in a direction perpendicular to the first direction and parallel to its faces when subjected to an electrostatic field of a given polarity substantially parallel to the said electrical axis and to contract in the first direction and expand in the second direction when the polarity of such field is reversed; and means securing the plate-like portions together face to face in a manner to constrain them in both of the said directions and cause the element, when its plate-like portions are subjected to the action of electrostatic fields of given polarity, to bend about two axes of curvature disposed at right angles to each other on opposite sides of the element and parallel to the faces thereof and, conversely, cause the establishment of such electrostatic fields when the element is mechanically bent, whereby variations in the specific piezo-electric effect incident to variation in temperature and incident to variation in the level of applied energy, are largely reduced.

4. In a piezo-electric device, the combination of a piezo-electric transducer element comprising in combination a flexible plate-like portion of material having substantially the piezo-electric properties of Rochelle salt crystal, the said plate-like portion having an electrical axis substantially perpendicular to the faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed, and constraining means adapted to oppose expansion and contraction of the flexible portion in both of the said directions and cause said portion, when subjected to the action of an electrostatic field of given polarity, to bend about two axes of curvature disposed at right angles to each other on opposite sides of the element and parallel to the faces of the plate-like portion of the element and, conversely, cause the establishment of such an electrostatic field when the portion is mechanically bent, whereby variations in the specific piezo-electric effect incident to variation in temperature and incident to variation in the level of applied energy, are largely reduced; and means connected to the piezo-electric element and adapted to be driven by and to drive the said element.

5. In a piezo-electric device, the combination of a piezo-electric transducer element comprising in combination a flexible plate-like portion of material having substantially the piezo-electric properties of Rochelle salt crystal, the said plate-like portion having an electrical axis substantially perpendicular to the faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed, and a flexible plate-like body cemented to one face of the said plate-like portion and adapted to oppose expansion and contraction of the said portion in both of the said directions and cause said portion, when subjected to the action of an electrostatic field of given polarity, to bend about two axes of curvature disposed at right angles to each other on opposite sides of the element and parallel to the faces of the said portion of the element and, conversely, cause the establishment of such an electrostatic field when the portion is mechanically bent, whereby variations in the specific piezo-electric effect incident to variation in temperature and incident to variation in the level of applied energy, are largely reduced; and means connected to the piezo-electric element and adapted to be driven by and to drive the said element.

6. In a piezo-electric device, the combination of a piezo-electric transducer element comprising in combination a plurality of flexible plate, like portions of material having substantially the piezo-electric properties of Rochelle salt crystal, said plate-like portions being disposed in opposed electrostatic relationship to each other with the faces of each portion substantially perpendicular to an electrical axis whereby each portion is adapted to expand in one direction parallel to its faces and simultaneously to contract in a direction perpendicular to the first direction and parallel to its faces when subjected to an electrostatic field of a given polarity substantially parallel to the said electrical axis and to contract in the first direction and expand in the second direction when the polarity of such field is reversed, and means securing the plate-like portions together face to face in a manner to constrain them in both of the said directions and cause the element, when its plate-like portions are subjected to the action of electrostatic fields of given polarity, to bend about two axes of curvature disposed at right angles to each other on opposite sides of the element and parallel to the faces thereof and, conversely, cause the establishment of such electrostatic fields when the element is mechanically bent, whereby variations in the specific piezo-electric effect incident to variation in temperature and incident to variation in the level of applied energy, are largely reduced; and means connected to the piezo-electric element and adapted to be driven by and to drive the said element.

7. In a piezo-electric device, the combination of a piezo-electric transducer element comprising in combination a plurality of flexible plate-like portions of material having substantially the piezo-electric properties of Rochelle salt crystal, said plate-like portions being disposed in opposed electrostatic relationship to each other with the faces of each portion substantially perpendicular to an electrical axis whereby each portion is adapted to expand in one direction parallel to its faces and simultaneously to contract in a direction perpendicular to the first direction and parallel to its faces when subjected to an electrostatic field of a given polarity substantially parallel to the said electrical axis and to contract in the first direction and expand in the second direction when the polarity of such field is reversed, electrode means associated with outer and inner faces of said plate-like portions, said electrode means being substantially coextensive with said faces and connected to establish electrostatic fields of opposite senses on the two sides of an innner electrode, and means securing the plate-like portions together face to face in a manner to constrain them in both of the said directions and cause the element, when its plate-like portions are subjected to the action of electrostatic fields of given polarity, to bend about two axes of curvature disposed at right angles to each other on opposite sides of the element and parallel to the faces thereof and, conversely, cause the establishment of such electrostatic fields when the element is mechanically bent, whereby variations in the specific piezo-electric effect incident to variation in temperature and incident to variation in the level of applied energy, are largely reduced; and means connected to the piezo-electric element and adapted to be driven by and to drive the said element.

CHARLES B. SAWYER.

CERTIFICATE OF CORRECTION.

Reissue No. 20,213. December 22, 1936.

CHARLES B. SAWYER.

It is hereby certified that error appears in the printed specification of the above numbered patent requiring correction as follows: Page 2, second column, line 21, for the numeral "21" read 31; line 69, for the word "comprises" read comprising; page 3, first columh, line 56, after the word and period "absent." insert the following sentences:

> Furthermore, with the trapezoidal form more uniform bending and stressing of the crystal portions are secured than with the rectangular form so that a larger driven load can be carried with a given volume of the crystalline material. In addition, due to the equalization of stresses, the piezo-electric effect is more efficiently utilized.;

and beginning with the words "The simultaneous", line 67, strike out all to and including the word and period "element.", same page, second column, line 5; page 4, first column, line 7, after "energy" insert a comma; and second column, line 29, strike out the words "the great ruggedness, the low impedance and" and insert the same after "by", line 32; page 5, second column, line 50, claim 6, strike out the comma after "plate" and insert instead a hyphen; and that the said Letters Patent should be read with these corrections therein that the same may conform to the record of the case in the Patent Office.

Signed and sealed this 9th day of March, A. D. 1937.

(Seal)

Henry Van Arsdale
Acting Commissioner of Patents.

variations in the specific piezo-electric effect incident to variation in temperature and incident to variation in the level of applied energy, are largely reduced; and means connected to the piezo-electric element and adapted to be driven by and to drive the said element.

7. In a piezo-electric device, the combination of a piezo-electric transducer element comprising in combination a plurality of flexible plate-like portions of material having substantially the piezo-electric properties of Rochelle salt crystal, said plate-like portions being disposed in opposed electrostatic relationship to each other with the faces of each portion substantially perpendicular to an electrical axis whereby each portion is adapted to expand in one direction parallel to its faces and simultaneously to contract in a direction perpendicular to the first direction and parallel to its faces when subjected to an electrostatic field of a given polarity substantially parallel to the said electrical axis and to contract in the first direction and expand in the second direction when the polarity of such field is reversed, electrode means associated with outer and inner faces of said plate-like portions, said electrode means being substantially coextensive with said faces and connected to establish electrostatic fields of opposite senses on the two sides of an innner electrode, and means securing the plate-like portions together face to face in a manner to constrain them in both of the said directions and cause the element, when its plate-like portions are subjected to the action of electrostatic fields of given polarity, to bend about two axes of curvature disposed at right angles to each other on opposite sides of the element and parallel to the faces thereof and, conversely, cause the establishment of such electrostatic fields when the element is mechanically bent, whereby variations in the specific piezo-electric effect incident to variation in temperature and incident to variation in the level of applied energy, are largely reduced; and means connected to the piezo-electric element and adapted to be driven by and to drive the said element.

CHARLES B. SAWYER.

CERTIFICATE OF CORRECTION.

Reissue No. 20,213. December 22, 1936.

CHARLES B. SAWYER.

It is hereby certified that error appears in the printed specification of the above numbered patent requiring correction as follows: Page 2, second column, line 21, for the numeral "21" read 31; line 69, for the word "comprises" read comprising; page 3, first columh, line 56, after the word and period "absent." insert the following sentences:

> Furthermore, with the trapezoidal form more uniform bending and stressing of the crystal portions are secured than with the rectangular form so that a larger driven load can be carried with a given volume of the crystalline material. In addition, due to the equalization of stresses, the piezo-electric effect is more efficiently utilized.;

and beginning with the words "The simultaneous", line 67, strike out all to and including the word and period "element.", same page, second column, line 5; page 4, first column, line 7, after "energy" insert a comma; and second column, line 29, strike out the words "the great ruggedness, the low impedance and" and insert the same after "by", line 32; page 5, second column, line 50, claim 6, strike out the comma after "plate" and insert instead a hyphen; and that the said Letters Patent should be read with these corrections therein that the same may conform to the record of the case in the Patent Office.

Signed and sealed this 9th day of March, A. D. 1937.

(Seal)

Henry Van Arsdale
Acting Commissioner of Patents.